Jan. 17, 1939.   G. W. BECKER   2,143,837
INFLATABLE RUBBER ARTICLE
Filed July 3, 1935
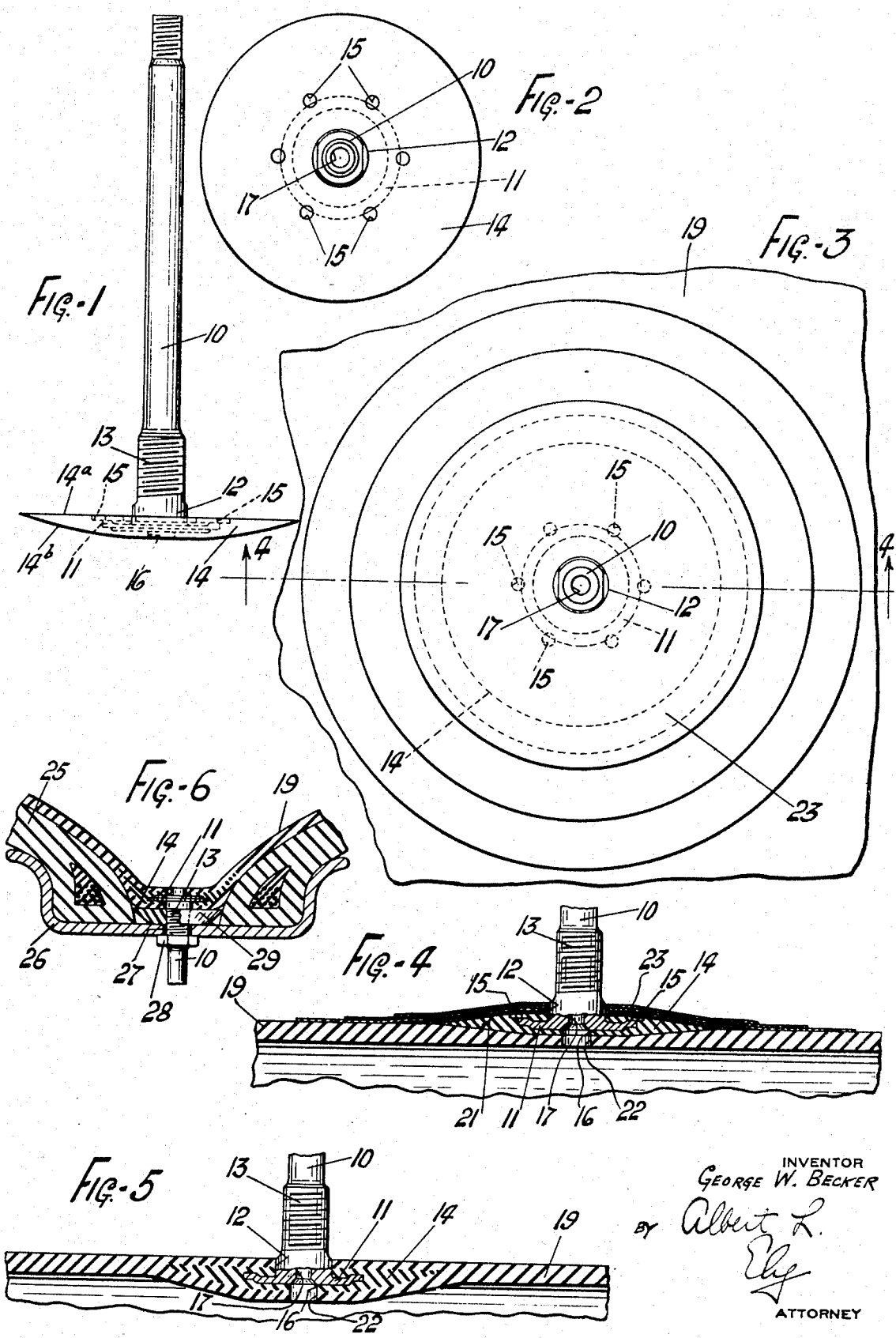

Patented Jan. 17, 1939

2,143,837

UNITED STATES PATENT OFFICE 2,143,837

INFLATABLE RUBBER ARTICLE

George W. Becker, Silver Lake, Ohio, assignor, by mesne assignments, to The Firestone Tire & Rubber Company, Akron, Ohio, a corporation of Ohio Application July 3, 1935, Serial No. 29,640

6 Claims. (Cl. 152—429)

This invention relates to inflatable rubber articles and to methods of making the same, and more especially it relates to improvements in the mounting of valve stems in the walls of inflatable rubber articles, such as inner tubes for pneumatic tires, and to improved procedure for incorporating said valve stems in the tube structures.

The invention is of primary utility in the mounting of metal valve stems in inner tubes, especially inner tubes of large size which have relatively thick walls.

The chief objects of the invention are to provide an improved inner tube structure; to provide an improved valve stem mounting in an inner tube to prevent the valve stem from being torn therefrom; to prevent leakage of air from the tube at the place where the valve stem is mounted therein; to provide a superior valve stem mounting in an inner tube without greatly increasing the thickness of the tube-wall thereat; and to provide an improved method whereby the foregoing objects are achieved.

Of the accompanying drawing:

Figure 1 is a side elevation of a metal valve stem provided with a rubber base flange constituting a part of the invention;

Figure 2 is a plan view thereof;

Figure 3 is a fragmentary plan view of a rubber tube wall and a valve stem mounted therein, before the tube is vulcanized;

Figure 4 is a section on the line 4—4 of Figure 3;

Figure 5 is a section similar to Figure 4, after the tube has been vulcanized; and Figure 6 is a fragmentary, transverse section through a pneumatic tire and tire base, and the improved inner tube mounted for use within the tire.

Referring to the drawing, 10 is a metal valve stem of known or preferred construction, which valve stem is formed at its bottom with an enlarged flange or head 11, and has a small smooth region 12 on its structure immediately above said head, and a threaded portion 13 immediately above said smooth region. The head 11 is completely encased and vulcanized into a fully vulcanized rubber base flange 14 that preferably has the shape of a spherical segment, being circular in plan and having a plane top face 14a that is normal to the axis of the valve stem 10 and having a convex bottom face 14b of sufficiently great radius to provide the flange with a relatively thin, and hence somewhat flexible, peripheral region. The flange 14 has an opening 16 in its bottom, which opening is in registry with the air passage 17 of the valve stem. The rubber of the base flange 14 is a relatively tough and stiff composition, whereby a fluid-tight union with the head 11 is effected, and the possibility of separation of the parts is obviated. The shallow recesses indicated at 15, 15 of the drawing are formed by the lugs that support the valve stem in the mold while the flange 14 is being molded and vulcanized thereonto, and have no other function in the invention.

The valve stem described is arranged to be mounted in the wall of an inner tube, a portion of the latter being shown at 19 in the drawing. As hereinbefore stated, the invention is especially advantageous in inner tubes of large size, wherein the tube wall is relatively thick as shown. In preparing an unvulcanized tube to receive the valve stem, a spherical segment of stock is cut from the outer face of the tube wall, adjacent an end thereof, which segment is substantially or nearly the same size and shape as the flange 14 of the valve stem, thus forming a concavity 21 in said tube wall. Preferably the depth of the concavity 21 is about half the thickness of the tube wall. Thereafter an aperture 22 is formed in the tube wall, concentric with the axis of concavity 21. After the face of the tube including the concavity 21 has been wiped with a suitable hydrocarbon rubber solvent, the valve stem structure shown in Figures 1 and 2 is mounted thereon, the flange 14 seating in said concavity and the opening 16 in said flange registering with aperture 22 in the tube. Next, the flange 14 is overlaid with an unvulcanized rubber patch 23 comprising a plurality of plies of concentric, circular sheet rubber discs of different diameters arranged with stepped or offset margins whereby the said patch is thinner at its marginal portion than in its central portion. Said central region of the patch is of greater diameter than the flange 14, and at its middle the patch fits snugly about the smooth region 12 of the valve stem.

After the structure is assembled as described, and shown in Figures 3 and 4, the respective ends of the tube 19 may be spliced together in the usual manner and the tube vulcanized in a mold under heat and internal pressure as is well understood by those skilled in the art. During the vulcanizing operation the plies of the patch 23 coalesce with each other and with the tube 19 where they contact the latter, to form a homogeneous, unitary structure, and patch and tube wall become adhesively united to flange 14 by vulcanization, whereby the flange is firmly embedded within the tube wall and subsequent separation therefrom prevented.

As will be seen by reference to Figure 5 which shows the valve installation after vulcanization, the finished tube presents a substantially smooth inner and outer surface in the region of the valve stem. The rubber composition from which the tube 19 is made, and the rubber of the patch 23, when vulcanized is relatively flexible and elastic as compared to the composition of the flange 14, yet the thin flexible margin of the latter prevents such sharp flexure at the juncture of the flange and tube stock as might strain the tube or tend to cause separation of flange and tube stock. Moreover, the relatively stiff composition of the flange 14 more effectively prevents the head 11 of the valve stem from being pulled from the tube than would be the case if said head were embedded in the ordinary soft and elastic tube stock. Obviously, the shape of the flange 14 may be other than circular if desired; for example, it might be elliptical, or it might be rhombus-shaped in plan.

In Figure 6 the improved inner tube 19 is shown mounted in a pneumatic tire casing 25 and the latter mounted upon the usual tire rim 26, the valve stem 10 extending through an aperture 27 in the rim and being secured in place by a nut 28 threaded onto its threaded portion 13. Mounted upon said threaded portion 13, between the inner tube 19 and the rim 26, is an annular rubber washer 29 that replaces the usual bridge clip. The washer 29 has a beveled peripheral margin as shown, and is mounted with its large diameter adjacent the tube so that it fits nicely between the toes of the tire beads. The washer 29 limits the extent to which the tube wall and valve stem head 11 can be drawn down between the tire beads, and thus prevents such sharp flexure of the rubber structure about said head 11 as might injure said structure.

Modification may be resorted to without departing from the spirit of the invention or the scope of the appended claims.

What is claimed is:

1. An inner tube comprising a wall of relatively flexible and elastic rubber composition, a metal valve stem having an enlarged head at its base, and a flange of relatively stiff, tough rubber composition vulcanized to and completely encasing said head, said flange being vulcanized within the tube wall between the inner and outer surfaces thereof.

2. An inner tube comprising a wall of relatively flexible and elastic rubber composition, and a valve stem formed with a base flange of relatively stiff, tough rubber, said base flange having the shape of a spherical segment and being vulcanized entirely within the wall of the tube with its convex face disposed innermost.

3. A valve stem comprising a tubular metal structure formed with an enlarged head at its base, and a base flange of vulcanized, stiff, tough rubber composition encasing said head, said flange having the shape of a spherical segment, the metal structure projecting from the flat face of said flange.

4. A valve stem comprising a tubular structure having a base flange of vulcanized rubber, said flange having the shape of a spherical segment, the tubular portion of the stem projecting from the flat face of said flange.

5. A valve stem comprising a tubular structure having a base flange of vulcanized rubber, said flange having a completely convex bottom face, and having a flat top face from which the tubular structure projects.

6. An inner tube comprising a wall of relatively flexible and elastic rubber composition, a metal valve stem having an enlarged head at its base, and a flange of rubber composition vulcanized to and completely encasing said head, said flange being vulcanized within the tube wall between the inner and outer surfaces thereof.

GEORGE W. BECKER.